United States Patent [19]

Morelock

[11] Patent Number: 4,737,328
[45] Date of Patent: Apr. 12, 1988

[54] INFILTRATION OF MATERIAL WITH SILICON

[75] Inventor: Charles R. Morelock, Saratoga Springs, N.Y.

[73] Assignee: General Electric Company, Schenectady, N.Y.

[21] Appl. No.: 759,814

[22] Filed: Jul. 29, 1985

[51] Int. Cl.$^4$ ............................................. C04B 35/70
[52] U.S. Cl. ...................................... 264/62; 264/60; 264/101
[58] Field of Search ............................ 264/60, 62, 101

[56] References Cited

U.S. PATENT DOCUMENTS

| | | | |
|---|---|---|---|
| 3,982,911 | 9/1976 | Lee | 51/307 |
| 4,120,731 | 10/1978 | Hillig | 428/408 |
| 4,141,948 | 2/1979 | Laskow | 264/101 |
| 4,148,894 | 4/1979 | Hillig | 428/242 |
| 4,220,455 | 9/1980 | St. Pierre | 51/295 |
| 4,238,433 | 12/1980 | Hillig | 264/60 |
| 4,240,835 | 12/1980 | Laskow | 428/408 |
| 4,242,106 | 12/1980 | Morelock | 51/307 |
| 4,247,304 | 1/1981 | Morelock | 51/295 |
| 4,353,953 | 10/1982 | Morelock | 428/213 |
| 4,448,591 | 5/1984 | Ohno | 264/60 |

*Primary Examiner*—James Derrington
*Attorney, Agent, or Firm*—Jane M. Binkowski; James C. Davis, Jr.; James Magee, Jr.

[57] ABSTRACT

A process for producing a composite by embedding a porous body at least partly composed of a substance which reacts with silicon in a powder mixture composed of silicon and hexagonal boron nitride powder, heating the resulting structure to a temperature at which the silicon is fluid and infiltrating the fluid silicon into the porous body.

20 Claims, No Drawings

INFILTRATION OF MATERIAL WITH SILICON

The present invention relates to a process for infiltrating a porous body of a material with silicon.

The infiltration of materials with silicon has previously been carried out by using some form of a carbon fiber wick to transport liquid silicon from a reservoir to the material being infiltrated. U.S. Pat. Nos. 4,120,731; 4,141,948; 4,148,894; 4,220,455; 4,238,433; 4,240,835; 4,242,106; 4,247,304 and 4,353,953, assigned to the assignee hereof and incorporated herein by reference disclose such infiltration of silicon using a carbon wick. After infiltration, this wick becomes an integral part of the infiltrated body and requires removal by diamond machining. For very small or thin bodies, not only is removing the wick a problem, but in addition, the molds necessary for the silicon infiltration of some shapes are rather complex.

According to the present invention, materials can be infiltrated with silicon by embedding them in a mixture of silicon and hexagonal boron nitride powders. The vacuum pressure, furnace temperature, and time at temperature are the same, or substantially the same, as used in the techniques employing carbon wicks.

Briefly stated, in one embodiment, the present process for infiltrating a porous body of a material with silicon to form a composite comprises providing a material wherein at least about 5% by volume of said material comprises a component which reacts with silicon, said material having a melting point higher than that of said silicon, forming a porous body of said material having an open porosity ranging from greater than about 10% by volume to about 90% by volume of said body, contacting said body with a powder mixture comprised of a powder of said silicon and hexagonal boron nitride powder wherein said silicon powder ranges in amount from greater than about 10% by volume to less than about 90% by volume of said mixture, heating the resulting structure in a nonoxidizing partial vacuum to a temperature at which said silicon is fluid but below the melting point of said material and which does not have a significantly deleterious effect on said material and infiltrating said fluid silicon into said porous body forming said composite, said partial vacuum being at least sufficient to remove gas from said porous body which blocks said infiltrating fluid silicon.

Briefly stated, in another embodiment, the present process for infiltrating a porous body of a material with silicon to form a composite comprises forming a mixture comprised of a powder of said silicon and hexagonal boron nitride powder wherein said silicon powder ranges in amount from greater than about 10% by volume to less than about 90% by volume of said mixture, shaping said mixture into a mold having a cavity of the size and shape of said composite, providing a material wherein at least about 5% by volume of said material comprises a component which reacts with silicon, said material being in the form of particles, filaments, cloth or mixtures thereof and having a melting point higher than that of said silicon, packing said material into said cavity producing a packed material or porous body therein having an open porosity ranging from greater than about 10% by volume to about 90% by volume of said packed material or porous body, heating the resulting structure in a nonoxidizing partial vacuum to a temperature at which said silicon is fluid but below the melting point of said material and which does not have a significantly deleterious effect on said material and infiltrating said fluid silicon into said packed material or porous body forming said composite, said partial vacuum being at least sufficient to remove gas from said porous body which blocks said infiltrating fluid silicon, In carrying out the present process, a mixture of elemental silicon powder and hexagonal boron nitride powder is formed and contacted with the surface of the porous body or packed material to be infiltrated. Since molten silicon does not wet or react with the hexagonal boron nitride powder, at the temperatures used, it does not coalesce, and therefore, permits easy movement by vapor and liquid flow to the surfaces of the porous body or constrained material where it reacts, wets and infiltrates. Without the hexagonal boron nitride powder there would be no control over the silicon infiltration. Specifically, the silicon would not infiltrate the body uniformly and would form droplets on its surface thereby leaving significantly large silicon nodules thereon which would require diamond machining for their removal.

The silicon powder can range widely in size but preferably should not be greater than about 100 mesh, i.e. no greater than about 150 microns, since a larger particle size would have a tendency to coalesce and not infiltrate the body. Preferably, the silicon powder has a particle size of about 200 mesh, i.e. no greater than about 75 microns.

The hexagonal boron nitride powder can range widely in size but preferably should not be greater than about 100 mesh, i.e. no greater than about 150 microns, since a larger particle size may allow the silicon to coalesce thereby preventing its infiltration into the body. Preferably, the hexagonal boron nitride powder has a particle size of about 325 mesh, i.e. no greater than about 45 microns.

As used herein by mesh it is meant U.S. Sieve Size.

In the present powder mixture of silicon and hexagonal boron nitride, the silicon powder ranges in amount from greater than about 10% by volume to about 90% by volume of the mixture depending largely on the rate at which the infiltration of the fluid silicon into the porous body is to be carried out. The smaller the amount of silicon in the mixture, the slower will be the rate of infiltration. Preferably, the silicon content of the mixture ranges from about 50% by volume to about 85% by volume, more preferably from about 60% by volume to about 80% by volume, of the mixture. Silicon should be present in the powder mixture at least in an amount sufficient to produce the desired composite.

The mixture of silicon and hexagonal boron nitride powders can be formed by a number of conventional techniques. For example, the two powders can simply be mixed together to produce the present mixture. At least a significantly uniform mixture of the two powders is formed, and preferably a uniform or substantially uniform mixture is formed.

The present mixture of silicon and hexagonal boron nitride powders can be used in a variety of forms, i.e. it can be placed in contact with the material to be infiltrated by a number of techniques. For example, the powder mixture can be in the form of a pressed powder or in the form of a mold with a cavity of the size and shape desired of the final infiltrated body or composite. Before infiltration, when in contact with the porous body or compacted material, the present mixture preferably has a porosity of less than about 50% by volume, more preferably less than about 40% by volume, and still more preferably less than about 30% by volume of the powder mixture.

In one embodiment, supporting means, preferably graphite or other elemental carbon, provided with a cavity are used and the present porous body is embedded in the present powder mixture in the cavity. Preferably, the resulting assembly is heated to infiltration temperature. Any supporting means used in the present process should have no significant deleterious effect thereon. Also, preferably, the cavity of any supporting means is precoated with a parting agent such as hexagonal boron nitride to prevent sticking.

The present mixture of silicon and hexagonal boron nitride powders can be formed into a mold with the desired cavity by a number of techniques. In one embodiment, cavity-containing supporting means, preferably graphite or other elemental carbon with a cavity machined therein, is used and a layer of the mixture is pressed against the inner surface of such cavity producing the desired mold. In another embodiment, the mixture can be extruded, injection molded or die-pressed to produce a mold with a cavity of the size and shape of the composite. Any lubricants, binders or similar materials used in shaping the powder mixture should have no significant deleterious effect in the present process. Such materials are of the type which evaporate or decompose on heating below the present infiltration temperature, preferably below 500° C., leaving no deleterious residue. Representative of useful binders are liquid epoxy resin and water. In one embodiment a liquid resin composition is used which hardens on exposure to air, or when heated, and the mold is then dried or cured to give it the desired mechanical strength.

In the present process, at least about 5% by volume of the material to be infiltrated is comprised of a component which reacts with silicon. Silicon has an affinity for a substance with which it reacts and will migrate toward such substance. Such a reactive component is required in order for the silicon to infiltrate the porous body. Representative of the present component which reacts with silicon is elemental carbon and a metal such as, for example, molybdenum, titanium, chromium, tungsten, silver and aluminum. As used herein, the term "elemental carbon" includes all forms of elemental non-diamond carbon including graphite.

The component which reacts with silicon can be present in an amount ranging from about 5% by volume to about 100% by volume of the material to be infiltrated and the particular amount of such component depends largely on the particular composite desired. Frequently, however, the component which reacts with silicon is present in an amount of at least about 10% by volume, or at least about 20% by volume, or at least about 50% by volume, of the material to be infiltrated.

Generally, that portion of the present material which is not reactive with silicon is comprised of a ceramic material such as, for example, silicon carbide, silicon nitride, boron nitride and aluminum nitride. Diamond may be present as a nonreactive component depending largely on its particle size, and in a fine particle size it can react with silicon to form silicon carbide.

The present material to be infiltrated can be in a wide variety of forms. For example, it can be in the form of particles, filament, cloth and mixtures thereof. The term filament herein includes fiber and whisker.

The material to be infiltrated can be formed into a porous body by a number of techniques. Preferably, the porous body is of the size and shape desired of the composite. For example, it can be extruded, injection molded, die-pressed, isostatically pressed or slip cast to produce the porous body of desired size and shape. Any lubricants, binders, or similar materials used in shaping the material should have no significant deleterious effect in the present process. Such materials are of the type which evaporate on heating at temperatures below the present infiltration temperature, preferably below 500° C., leaving no deleterious residue.

Alternately, if desired, the present material to be infiltrated can be packed into the cavity of a mold of the present powder mixture to form a packed or constrained material, i.e. the present porous body.

The present porous body or packed material has an open porosity ranging from greater than about 10% by volume to about 90% by volume of the body, and the particular amount of such open porosity depends largely on the particular composite desired. Specifically, the porous body or packed material can have an open porosity ranging from about 15% by volume to about 80% by volume, or from about 30% by volume to about 60% by volume, of the body. By open porosity of the body, it is meant herein pores or voids which are open to the surface of the body and thereby making the interior surfaces accessible to the ambient atmosphere. Open porosity can be determined by standard metallographic techniques. Preferably, the present packed material or porous body to be infiltrated does not have any closed porosity or does not have any significant amount of closed porosity.

The pores in the porous body or packed material preferably should be distributed uniformly or at least significantly uniformly to prevent formation of excessively large pockets of elemental silicon which may lower the mechanical properties of the resulting infiltrated body or composite, which generally is a polycrystalline body, thereby limiting its applications. The pores can range in size, and generally can range up to about 2000 microns. For best results, the pores are submicron in size.

In carrying out the present process, a structure is formed comprised of the present mixture of silicon and hexagonal boron nitride in contact with the porous body or packed material to be infiltrated. Such a structure can be formed by a number of techniques. In one embodiment, such a structure is comprised of the porous body with a deposit of the pressed powder mixture thereon. In another embodiment, the structure is comprised of the material packed in a mold of the present powder mixture. The extent to which the present mixture is in contact with the surface of the porous body depends largely on the particular composite desired. Generally, the porous body or packed material is immersed in, or enveloped by, the present powder mixture leaving none of its surface exposed.

In a first specific embodiment of the present invention wherein a mold of the present mixture of silicon and hexagonal boron nitride powders is first formed, a predetermined quantity of the powder mixture is mixed with a small amount of binder material and then placed in a boron nitride coated cavity machined in a graphite block. This damp mixture is then pressed at a suitable pressure, usually about 100 psi, with a metal master the exact shape of the silicon infiltrated part desired. After curing or drying, the metal master is removed and the resulting cavity of the powder mixture is filled with material that is to be infiltrated with silicon. Additional powder mixture is placed on top of the filled cavity and pressed at a suitable pressure, preferably to about 100 psi, with a metal ram leaving none of the material exposed. The ram is then removed leaving a structure in the graphite cavity comprised of the present porous body enveloped by a mold of the present powder mixture. Preferably, hexagonal boron nitride powder is placed over the mixture. Porous carbon felt pads are then placed on top of the hexagonal boron nitride powder and held in place with a small block of graphite which is secured to the cavity-containing graphite with graphite screws or wrapped and tied with carbon fiber tow. The hexagonal boron nitride powder placed over the mixed powder provides a barrier to prevent excessive silicon reaction with the carbon felt. The carbon felt holds all of the powders in place during evacuation and heating. Also, the carbon felt is very porous and allows gas to escape. The complete graphite assembly is placed in a vacuum furnace, evacuated to preferably about 0.1 torr, and heated to the required temperature for the time necessary. When cool and restored to atmospheric pressure, the assembly can be removed from the furnace, disassembled, and the silicon infiltrated part removed from the powder mixture.

In a second specific embodiment of the present invention, a previously prepared preform of the material to be infiltrated, i.e. the present porous body, is embedded or immersed, in a predetermined quantity of the present powder mixture contained in a boron nitride coated cavity machined in a block of graphite. The powder mixture and preform are pressed under sufficient pressure, for example about 100 psi, with preferably a metal ram. The ram is then removed leaving a structure comprised of the porous body enveloped by the pressed powder mixture supported in the graphite block, and from this point on, the procedure is the same as disclosed for the first specific embodiment.

The present structure or assembly is heated to infiltration temperature in a nonoxidizing partial vacuum wherein the residual gases have no significantly deleterious effect on said structure or assembly and the present infiltration is carried out in such nonoxidizing partial vacuum. Preferably, such nonoxidizing partial vacuum is provided before heating is initiated. The partial vacuum should be at least sufficient to remove pockets of gas which may be trapped within the porous body which would block the infiltrating fluid silicon. Generally, such a partial vacuum ranges from about 0.01 torr to about 2 torr, and usually from about 0.01 torr to about 1 torr to insure removal of entrapped gas in the body being infiltrated.

Ordinarily and as a practical matter, the furnace used is a carbon furnace, i.e. a furnace fabricated from elemental carbon. Such a furnace acts as an oxygen getter for the atmosphere within the furnace reacting with oxygen to produce CO or $CO_2$ and thereby provides a nonoxidizing atmosphere, i.e. the residual gases have no significantly deleterious effect on the infiltrating silicon. The present infiltration cannot be carried out in air because the liquid silicon would oxidize to form solid silica before any significant infusion by silicon occurred. In such instance where a carbon furnace is not used, it is preferable to have an oxygen getter present in the furnace chamber, such as elemental carbon, in order to insure the maintenance of a nonoxidizing atmosphere. Alternatively, such nonoxidizing atmosphere, or atmosphere which has no significant deleterious effect on the structure within the furnace, can be provided by a sufficiently high partial vacuum, i.e. about $10^{-2}$ torr to 2 torr.

The present infiltration is carried out at a temperature at which silicon is fluid and which has no significant deleterious effect on the material being infiltrated. The present infiltration temperature ranges from a temperature at which the silicon becomes fluid to a temperature at which there is no significant vaporization of the silicon. Preferably, the present infiltration temperature ranges from about 1375° C., or from about 1400° C., or from greater than about 1400° C. to about 1600° C. By a temperature at which silicon is fluid it is meant herein a temperature at which the silicon is readily flowable. Specifically, when silicon is at its melting temperature, it has a high viscosity, but as its temperature is raised, it becomes less viscous and at a temperature about ten degrees higher than its melting point, it becomes fluid. The melting point of the silicon can vary depending largely on the particular impurities which may be present. The temperature at which the silicon is fluid is the temperature at which it will infuse or infiltrate through the capillary-size passages, interstices or voids of the present packed material or porous body. With increase in temperature, the flowability of the fluid silicon increases resulting in a faster rate of infiltration and reaction.

The fluid silicon is highly mobile and highly reactive with elemental carbon, i.e. it has an affinity for elemental carbon, wetting it and reacting with it to form silicon carbide. The fluid silicon also has an affinity for several metals such as, for example, molybdenum, titanium, chromium, tungsten, silver and aluminum, reacting with them to form the silicide.

Preferably, the composite produced by the present process has a porosity of less than about 10% by volume, more preferably less than about 5% by volume, and most preferably less than about 1% by volume of the composite.

Preferably, in the present process, sufficient silicon is infiltrated into the porous body, infusing or infiltrating through the voids or pores of the porous body by capillary action to react with all of the elemental carbon which may be present forming silicon carbide, or react with all the metal which may be present forming metal silicide, and also to fill any pores or voids which may remain producing an integral, strongly bonded infiltrated body or composite which has no detectable porosity, or no significant porosity.

The resulting infiltrated body or composite is cooled in an atmosphere which has no significant deleterious effect on it, preferably it is furnace cooled in the nonoxidizing partial vacuum to about room temperature, and the resulting composite is recovered.

The period of time required for infiltration by the silicon is determinable empirically and depends largely on the size of the of the porous body or packed material and extent of infiltration required, and frequently it is completed within about 15 or 20 minutes.

Upon completion of the infiltration, a highly porous layer or deposit of hexagonal boron nitride, or mostly hexagonal boron nitride, remains which is mechanically week and which is easily brushed or scraped off the infiltrated body.

The present process not only eliminates the need for carbon wicks but also eliminates the use of a reservoir for silicon. In addition, the present process makes possible the controlled infiltration of silicon into the packed material or porous body in a uniform manner. Also, the present process does not leave any significant silicon nodules on the body. In addition, the present process allows the production of an infiltrated body directly in a wide range of sizes and shapes. The resulting infiltrated body has a wide range of uses depending on its particular composition such as, for example, a tool insert or wear resistant part.

The invention is further illustrated by the following examples where, unless otherwise stated, the procedure was as follows:

Commercially pure 200 mesh (no greater than about 75 microns) silicon powder was used.

Commercially pure 325 mesh (no greater than about 45 microns) hexagonal boron nitride powder was used.

Four parts of the silicon powder and one part of the hexagonal boron nitride powder were dry mixed in a conventional manner by stirring to produce a substantially uniform mixture.

The "Epon 828" used is a resin formed from the reaction of epichlorohydrin and Bisphenol A, which is a liquid at room temperature and which has an epoxide equivalent of 185–192. Epon 828 decomposes completely below 1300° C.

The curing agent used was diethylenetriamine, a liquid commonly called DTA which cures Epon 828 thereby solidifying it.

EXAMPLE 1

A graphite block having a cylindrical cavity with an inner diameter of about ⅜ inch and about ⅜ inch deep was used. All of the inner surface of the cavity was sprayed with a slurry of hexagonal boron nitride which left a thin coating of the boride thereon. About 2 grams of the present powder mixture of silicon and hexagonal boron nitride was dampened with about a drop of Epon 828 and a thin continuous layer of the moist mixture was pressed under a pressure of about 100 psi onto a portion of the inner surface of the graphite cavity with a metal master the exact shape and dimensions of the disc desired. The metal master was then removed leaving a mold of the powder mixture with a disc-shaped cavity of 0.5 inch inner diameter and 0.05 inch deep. The graphite block was heated in an oven at 100° C. for about 10 minutes to cure the mold. 0.16 gram of crushed carbon felt was placed in the disc-shaped cavity. A layer of the powder mixture of silicon and hexagonal boron nitride was deposited on top of the crushed carbon felt leaving none of its surface exposed and pressed to about 100 psi with a metal ram forming a compacted carbon felt or porous body having an estimated open porosity of about 25% by volume of the body. The ram was then removed leaving a structure comprised of the porous body enveloped by a mold of the powder mixture. The mold had a porosity of about 35% by volume. A layer of hexagonal boron nitride powder was deposited on top of the mold of powder mixture in the graphite cavity. Porous carbon felt pads were placed on top of the boron nitride powder and held in place with a small block of graphite which was placed on top of the pads and secured to the cavity-containing graphite block with graphite screws.

The complete graphite assembly was placed in a graphite vacuum furnace which was evacuated to about 0.1 torr and maintained at about 0.1 torr during silicon infiltration and subsequent furnace-cooling to room temperature. The residual gases in the furnace were non-oxidizing.

The furnace was heated to about 1500° C. and maintained at such temperature for 10 minutes. The power was then cut off and the assembly was furnace-cooled to room temperature.

A structure comprised of the silicon infiltrated disc in a porous mold was recovered from the graphite cavity without sticking. The porous mold was comprised mostly of hexagonal boron nitride and was easily scraped off the disc with a finger nail.

The infiltrated disc had no porosity, i.e. it was completely infiltrated, as determined by its density and by microscopic examination.

The infiltrated disc, i.e. present composite, was comprised of silicon carbide and silicon and would be useful as a wear resistant part.

EXAMPLE 2

This example was carried out in substantially the same manner as Example 1 except that instead of packing the crushed carbon felt, a preform, i.e. porous body, of the crushed carbon felt was initially made, and the powder mixture of silicon and hexagonal boron nitride was not formed into a mold.

Specifically, at room temperature, DTA curing agent was mixed with 0.01 gram Epon 828 resin in an amount of 10% by weight of the Epon 828, and this mixture was then admixed with 0.16 gram of the crushed carbon felt. The resulting mixture was placed in the cylindrical cavity of a metal block and pressed into the form of a disc with a metal plunger. The resulting assembly was placed in a 100° C. oven for one hour to cure, i.e. harden, the Epon 828. The resulting disc was recovered without sticking. The disc was 0.5 inch in diameter, 0.05 inch thick and had an estimated open porosity of about 25% by volume of the disc.

The disc was immersed, i.e. enveloped, in the powder mixture of silicon and hexagonal boron nitride in the cavity of a graphite block precoated with hexagonal boron nitride and pressed with a metal ram at about 100 psi compacting the powder mixture to a porosity of about 35% by volume of the powder mixture. The remaining procedure to form the infiltrated disc was the same as disclosed in Example 1.

The resulting silicon infiltrated disc was recovered from the graphite cavity without sticking. Some powder adhered to the disc but was easily scraped off with a finger nail.

The infiltrated disc had no porosity, i.e. it was completely infiltrated, as determined by its density and by microscopic examination.

The infiltrated disc, i.e. present composite, was comprised of silicon carbide and silicon and would be useful as a wear resistant part.

What claimed is:

1. A process for infiltrating a porous body with silicon to form a composite which consists essentially of providing a material wherein at least about 5% by volume of said material comprises a component which reacts with silicon, said component being selected from the group consisting of elemental carbon, a metal and a mixture thereof, said material having a melting point higher than that of said silicon, forming a porous body of said material having an open porosity ranging from greater than about 10% by volume to about 90% by volume of said body, contacting said body with a mixture consisting essentially of silicon powder and hexagonal boron nitride powder wherein said silicon powder ranges in amount from greater than about 10% by volume to less than about 90% by volume of said mixture, heating the resulting structure in a nonoxidizing partial vacuum to an infiltration temperature at which said silicon is fluid but below the melting point of said material, and infiltrating said fluid silicon into said porous body forming said composite leaving a porous deposit of hexagonal boron nitride on said composite, said partial vacuum being at least sufficient to remove gas from said porous body which blocks said infiltrating fluid silicon.

2. The process according to claim 1 wherein said silicon powder has a particle size ranging to about 150 microns and said hexagonal boron nitride has a particle size ranging to about 150 microns.

3. The process according to claim 1 wherein said silicon powder ranges in amount from about 60% by volume to about 80% by volume of said mixture.

4. The process according to claim 1 wherein before said infiltration, said mixture in contact with said porous body has a porosity of less than about 50% by volume of said mixture.

5. The process according to claim 1 wherein said porous body is contacted with said mixture in supporting means and the resulting assembly is heated to said infiltration temperature, said supporting means having no significant deleterious effect on said process.

6. The process according to claim 1 wherein said porous body is enveloped by said mixture in the cavity of a graphite piece and the resulting assembly is heated to said infiltration temperature.

7. The process according to claim 1 wherein said porous body has an open porosity ranging from about 15% by volume to about 80% by volume of said body and at least about 10% by volume of said material comprises a component which reacts with silicon.

8. The process according to claim 1 wherein the remainder of said material is comprised of a ceramic material selected from the group consisting essentially of silicon carbide, silicon nitride, boron nitride and aluminum nitride.

9. The process according to claim 1 wherein said metal is selected from the group consisting essentially of molybdenum, titanium, chromium, tungsten, silver and aluminum.

10. A process for infiltrating a packed material or porous body with silicon to form a composite which consists essentially of forming a powder mixture consisting essentially of silicon powder and hexagonal boron nitride powder wherein said silicon powder ranges in amount from greater than about 10% by volume to less than about 90% by volume of said mixture, shaping said mixture into a mold having a cavity of the size and shape of said composite, providing a material wherein at least about 5% by volume of said material comprises a component which reacts with silicon, said component being selected from the group consisting of elemental carbon, a metal and a mixture thereof, said material being in the form of particles, filaments, cloth or a mixture thereof and having a melting point higher than that of said silicon, packing said material into said cavity producing a packed material or porous body therein having an open porosity ranging from greater than about 10% by volume to about 90% by volume of said packed material or porous body, heating the resulting structure in a nonoxidizing partial vacuum to an infiltrating temperature at which said silicon is fluid but below the melting point of said material, and infiltrating said fluid silicon into said packed material or porous body forming said composite leaving a porous deposit of hexagonal boron nitride on said composite, said partial vacuum being at least sufficient to remove gas from said packed material or porous body which blocks said infiltrating fluid silicon.

11. The process according to claim 10 wherein said silicon powder has a particle size ranging to about 150 microns and said hexagonal boron nitride has a particle size ranging to about 150 microns.

12. The process according to claim 10 wherein said silicon powder ranges in amount from about 60% by volume to about 80% by volume of said mixture.

13. The process according to claim 10 wherein before said infiltration, said mixture in contact with said porous body has a porosity of less than about 50% by volume of said mixture.

14. The process according to claim 10 wherein said mixture is shaped into said mold in the cavity of supporting means and the resulting assembly is heated to said infiltration temperature, said supporting means having no significant deleterious effect on said process.

15. The process according to claim 10 wherein said mixture is shaped into said mold in the cavity of supporting means comprised of graphite.

16. The process according to claim 10 wherein said packed material or porous body has an open porosity ranging from about 15% by volume to about 80% by volume of said body and at least about 10% by volume of said material comprises a component which reacts with silicon.

17. The process according to claim 10 wherein the remainder of said material is comprised of a ceramic material selected from the group consisting essentially of silicon carbide, silicon nitride, boron nitride and aluminum nitride.

18. The process according to claim 10 wherein said metal is selected from the group consisting essentially of molybdenum, titanium, chromium, tungsten, silver and aluminum.

19. The process according to claim 10 wherein said packed material or porous body is enveloped by said powder mixture.

20. A process for infiltrating a porous body with silicon to form a composite which consists essentially of providing a material wherein at least about 20% by volume of said material comprises a component which reacts with silicon, said component being selected from the group consisting of elemental carbon, a metal and a mixture thereof, said material having a melting point higher than that of said silicon, forming a porous body of said material having an open porosity ranging from about 30% by volume to about 60% by volume of said body, contacting said body with a mixture consisting essentially of silicon powder and hexagonal boron nitride powder wherein said silicon powder ranges in amount from about 50% by volume to about 85% by volume of said mixture, heating the resulting structure in a nonoxidizing partial vacuum to an infiltration temperature at which said silicon is fluid but below the melting point of said material, and infiltrating said fluid silicon into said porous body forming said composite leaving a porous deposit of hexagonal boron nitride on said composite, said partial vacuum being at least sufficient to remove gas from said porous body which blocks said infiltrating fluid silicon.

* * * * *